United States Patent
Schweitzer et al.

(10) Patent No.: US 11,827,057 B2
(45) Date of Patent: Nov. 28, 2023

(54) TIRE TREAD AND A TIRE COMPRISING A TREAD

(71) Applicant: THE GOODYEAR TIRE & RUBBER COMPANY, Akron, OH (US)

(72) Inventors: Claude Schweitzer, Colmar-Berg (LU); Jean-Louis Marie Felicien Thomas, Arlon (BE); Julien Alexandre Vaissaud, Arlon (BE); Bodo Ahrens, Trier (DE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 378 days.

(21) Appl. No.: 16/990,472

(22) Filed: Aug. 11, 2020

(65) Prior Publication Data
US 2021/0046785 A1 Feb. 18, 2021

Related U.S. Application Data

(60) Provisional application No. 62/887,157, filed on Aug. 15, 2019.

(51) Int. Cl.
*B60C 11/03* (2006.01)
*B60C 11/11* (2006.01)

(52) U.S. Cl.
CPC ...... *B60C 11/0306* (2013.01); *B60C 11/0318* (2013.01); *B60C 11/11* (2013.01);
(Continued)

(58) Field of Classification Search
CPC . B60C 11/0306; B60C 11/0318; B60C 11/11; B60C 2011/0348;
(Continued)

(56) References Cited

U.S. PATENT DOCUMENTS 4,349,061 A * 9/1982 Hirakawa ............. B60C 11/005
152/546
5,176,765 A * 1/1993 Yamaguchi ........... B60C 11/005
152/209.7
(Continued)

FOREIGN PATENT DOCUMENTS

EP 1398182 A2 3/2004
EP 3208110 A1 8/2017
(Continued)

OTHER PUBLICATIONS

European Search Report for Application No. EP20189434 dated Dec. 10, 2020.

*Primary Examiner* — Galen H Hauth
*Assistant Examiner* — Shibin Liang
(74) *Attorney, Agent, or Firm* — Alvin T. Rockhill

(57) ABSTRACT

The subject invention reveals a tire tread having a circumferential tread cap with circumferential grooves, wherein the tread cap rubber compound has a Shore A hardness from 45 to 75. Moreover, the tread comprises at least one circumferential groove reinforcement reinforcing at least a bottom portion of at least one of the grooves and comprising a groove reinforcement rubber compound, wherein the groove reinforcement rubber compound has a Shore A hardness from 70 to 100. The tread also comprises a circumferential tread base layer arranged radially inwards of the tread cap and comprising a tread base layer compound, wherein the tread base layer compound has a Shore A hardness from 15 to 60, and wherein the Shore A hardness of the tread cap compound is higher than the Shore A hardness of the tread base layer compound.

16 Claims, 2 Drawing Sheets

(52) U.S. Cl.
CPC ............... *B60C 2011/0348* (2013.01); *B60C 2011/0355* (2013.01); *B60C 2011/0383* (2013.01); *B60C 2011/0388* (2013.01)

(58) Field of Classification Search
CPC ..... B60C 2011/0355; B60C 2011/0383; B60C 2011/0388; B60C 2013/006; B60C 11/0075; B60C 11/03; B60C 1/0016; B60C 11/005
See application file for complete search history.

(56) References Cited

U.S. PATENT DOCUMENTS

| | | | |
|---|---|---|---|
| 8,439,095 B2 | 5/2013 | Zhang et al. | |
| 8,833,411 B2 | 9/2014 | Zhao | |
| 8,919,404 B2 | 12/2014 | Schweitzer et al. | |
| 9,545,823 B2 | 1/2017 | Zhao et al. | |
| 9,623,707 B2* | 4/2017 | Schweitzer | B60C 11/0041 |
| 9,757,986 B2* | 9/2017 | Zhao | B60C 11/005 |
| 10,040,318 B2 | 8/2018 | Meza et al. | |
| 10,427,463 B2 | 10/2019 | Schweitzer | |
| 2009/0084477 A1 | 4/2009 | Sandstrom et al. | |
| 2013/0048169 A1* | 2/2013 | Erceg | B60C 11/0066 152/209.1 |
| 2016/0059632 A1 | 3/2016 | Zhao et al. | |
| 2016/0082774 A1 | 3/2016 | Zhao et al. | |
| 2018/0134086 A1* | 5/2018 | Schweitzer | B60C 11/0058 |

FOREIGN PATENT DOCUMENTS

| | | | | |
|---|---|---|---|---|
| JP | 2009126314 A | | 6/2009 | |
| JP | 2014019198 A | | 2/2014 | |
| JP | 2015013519 A | | 1/2015 | |
| KR | 101325396 | * | 11/2013 | ........... B60C 1/0016 |

* cited by examiner

TIRE TREAD AND A TIRE COMPRISING A TREAD

This application claims benefit of U.S. Provisional Patent Application Ser. No. 62/887,157, filed on Aug. 15, 2019. The teachings of U.S. Provisional Patent Application Ser. No. 62/887,157 are incorporated herein by reference in their entirety.

FIELD OF THE INVENTION

The present invention is directed to a tire tread having certain circumferential groove reinforcements therein and to tire having treads that include such circumferential groove reinforcements.

BACKGROUND OF THE INVENTION

Most general purpose pneumatic tires for vehicles, such as automobiles and trucks, include treads having grooves which are designed to direct water away from the tread area to improve traction on wet surfaces. However, some racing tires and tires for vehicles which are used only on dry surfaces have slick treads. In any case, the grooves on tire treads having a considerable influence on a plurality of tire properties, including rolling resistance, wet grip, traction on snow and/or ice, and noise generation characteristics. For instance, one source of increased rolling resistance is caused by the deformation of the tread in the area of the tread grooves and adjacent tread blocks or ribs which results in the generation of heat and accordingly increasing rolling resistance (reduced fuel economy). The performance characteristics of the tire is also impacted by such deformations as the tire rolls against a pavement or road surface during normal use. For example, the cornering stiffness is of the tire can be limited which in turn compromises the handling characteristics, particularly at higher vehicle speeds. In order to overcome such deficiencies and to improve tire performance characteristics numerous approaches for improving tire groove stiffness have been described in the prior art.

U.S. Pat. No. 8,919,404 B2 discloses tire groove reinforcements which extend in a circumferential direction along the tread grooves. In particular, such reinforcements comprise a compound which is relatively stiff compared to the compound which is provided in the tread ribs and laterally outer tread of the tire. U.S. Pat. No. 8,919,404 B2 more specifically discloses a rubber composition for groove reinforcement in a tread for a tire comprising: at least one rubber component; between about 50 phr and 120 phr of a filler, wherein at least 20 phr of the filler is a high surface area carbon black wherein the high surface area carbon black has an iodine adsorption number of at least 100 g/kg; and between 10 phr and 30 phr of a phenolic resin; and wherein the tread has a tread rubber composition for road contact and the rubber composition for groove reinforcement is a different composition located adjacent a groove, covering at least a groove bottom, but not extending to the unworn surface of the tread, the rubber composition for the groove reinforcement having a shore A hardness of greater than 80 and an elongation at break more than 300 percent, and wherein the groove reinforcement has two radially extending portions forming at least partially opposing sidewalls, the adjacent groove and a radially inner base which is in direct contact with a supporting structure arranged under the tread forming distinct reinforcement areas with respect to the lateral direction.

U.S. Pat. No. 9,623,707 B2 further discloses groove reinforcements which can be asymmetric oriented with respect to the center of the groove reinforced. U.S. Pat. No. 9,623,707 B2 more specifically reveals a tire comprising a tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove; wherein the groove reinforcement consists of a rubber composition, the rubber composition comprising: between about 50 phr and 120 phr of a filler, wherein at least 20 phr of the filler is a high surface area carbon black having an iodine adsorption number of at least 100 g/kg; and between 10 phr and 30 phr of a phenolic resin. U.S. Pat. No. 9,623,707 B2 further indicates that at least one groove reinforcement can be an asymmetric groove reinforcement which extends in the radial direction to form at least part of at least one sidewall of the adjacent groove, a part of the asymmetric groove reinforcement on one sidewall extending radially further than any part of the asymmetric groove reinforcement on the other sidewall. Such a tread can further a radially innermost tread base, where each groove reinforcement extends from the radially outer surface of the tread base in a radially outward direction at least to the bottom of the adjacent circumferential groove to form at least part of the bottom of that groove.

U.S. Pat. No. 10,427,463 B2 discloses groove reinforcements which also extend in an axial direction over multiple grooves such that the groove reinforcements of the circumferential grooves are integrally connected to one another in an axial direction. The tread intended to contact pavement or a road surface is made of a softer compound than the reinforcement. U.S. Pat. No. 10,427,463 B2 more specifically reveals a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove; wherein the first rubber compound comprises 100 parts by weight of at least one diene based elastomer, and from 1 phr to 150 phr of silica; and wherein the second rubber compound comprises a diene base elastomer, from 50 phr to 120 phr of a filler, wherein at least 20 phr of the filler is a high surface area carbon black having an iodine adsorption number of at least 100 g/kg, from 1 phr to 45 phr of a methylene acceptor, from 1 phr to 25 phr of a methylene donor, and from 1 phr to 30 phr of at least one additive selected from the group consisting of carbamic resins, liquid diene based polymers having a number average molecular weight ranging from 1000 to 25000, and aromatic hydrocarbon resins.

United States Patent Application Publication No. 2010/0154948 A1 discloses a tire tread with groove reinforcement comprising fibers which is basically a lining material within the groove. However, fiber material may be difficult to mix homogeneously into the composition. Inhomogeneities may result in areas of too high fiber concentration which may increase the probability of groove cracks. Moreover, fibers may impair recycling of unused rubber compound as fibers might end up in compounds which shall not include fibers if the new use is not limited accordingly. United States Patent Application Publication No. 2010/0154948 A1 more specifically reveals a tire having an axis of rotation, the tire comprising: two sidewalls extending radially outward; and a tread disposed radially outward of the two sidewalls and interconnecting the two sidewalls, the tread comprising a main portion comprising a first compound and a reinforcing structure comprising a second compound having reinforcing short fibers oriented between −20° to +20° to a circumferential direction of the tread, the main portion of the tread comprising at least one circumferential groove separating circumferential ribs, each circumferential groove having two sides and a base which are situated between them, the reinforcing structure comprising a layer of the second compound secured to the sides of each circumferential groove.

These prior art references utilize approaches which focus on improving the performance characteristics of tires by modifying the properties of the outer tread layer and groove reinforcements. While such prior art approaches may have provided some benefit over earlier designs there still continues to be a long felt need for further improvement in tire tread designs to attain further improvements in tire performance characteristics, including tread wear, rolling resistance (fuel economy), traction, vehicle handling (cornering stiffness), ride comfort, and noise generation.

SUMMARY OF THE INVENTION

A first object of the invention may be to provide an advanced tire tread. In particular, another object may be to support good cornering stiffness of the tire and/or treadwear while helping to optimize tire noise and/or driving comfort.

In one aspect of the invention, a tire tread is provided, the tread comprising a tread cap or (radially) outer tread having circumferential grooves and comprising a tread cap (or first) rubber compound for contacting the road when driving, the tread cap rubber compound having a Shore A hardness which is within the range of 45 to 75. Moreover, the tread comprises at least one circumferential groove reinforcement reinforcing at least a bottom portion of at least one of the grooves and comprising a groove reinforcement (or second) rubber compound, wherein the groove reinforcement rubber compound has a Shore A hardness from 70 to 100. Still in accordance with the above aspect of the invention, the tread comprises a circumferential tread base layer arranged radially inwards of the tread cap and comprising a tread base layer (or third) rubber compound, wherein the tread base layer rubber compound has a Shore A hardness which is within the range of 15 to 60. The Shore A hardness of the groove reinforcement rubber compound is higher than the Shore A hardness of the tread cap compound, while the Shore A hardness of the tread cap compound is higher than the Shore A hardness of the tread base layer compound. Such a distribution of stiffnesses of said three tread compounds is desirable to provide stiff grooves as well as a relatively soft base which supports better driving comfort at limited rolling resistance and/or noise. The term Shore A hardness as used herein refers to the hardness of the cured rubber compound or formulation being referenced.

In another embodiment, the tread cap rubber compound has a Shore A hardness which is within the range of 50 to 65 and the Shore A hardness of the base layer is which is within the range of 15 to 50, optionally from 15 to 45 or even from 20 to 40. Such a combination can further reduce noise generation and/or increase driving comfort.

In another embodiment, the Shore A hardness of the groove reinforcement may be within the range of 75 to 100, optionally from 80 to 100 or from 80 to 99. Such values of relatively high stiffness are most desirable for the groove reinforcement compound. In general, it is also possible that the groove reinforcement is as such reinforced by fiber material within the compound.

In another embodiment, the Shore A hardness of the tread cap compound is at least 5% (optionally at least 10%) lower than the Shore A hardness of the groove reinforcement compound and/or the Shore A hardness of the base layer compound is at least 5% (optionally at least 10%) lower than the Shore A hardness of the tread cap compound. Alternatively, or additionally, Shore A hardness of the tread cap compound is at most 40% lower and typically at most 30% lower than the Shore A hardness of the groove reinforcement compound and/or the Shore A hardness of the base layer compound is at most 40% lower and typically at most 30% lower than the Shore A hardness of the tread cap compound.

In still another embodiment, the tread base layer extends at least over the axial width of the radially inner bottom of the tread cap. This can further increase the effects of the desired combination of compounds.

In still another embodiment, the groove reinforcement extends at least over an axial width of one, two, three or more grooves and/or all grooves. However, even if the groove reinforcement extends over the width of multiple grooves (and may be considered to have a comb-like cross section), the ribs or blocks may have in general still the tread cap compound in a central portion.

In yet another embodiment, the tread base layer supports the outer axial ends of the tread cap or in other words supports the tread cap in the shoulder region of the tire.

In yet another embodiment, the groove reinforcement extends at its radially inner portion over 30% to 60% of the width of the tread base layer.

In yet another embodiment, the tread has multiple circumferential groove reinforcements, each groove reinforcement reinforcing one of the grooves and wherein each groove reinforcement has optionally an essentially U-shaped cross section in parallel to the radial and axial directions.

In still another embodiment, the base layer has at one or both of its axial ends a skirt (or wing) portion in which the base layer is radially thicker than in an area axially closer or adjacent to the equatorial plane (EP) of the tire or tread. In other words, in the skirt portion, the radial thickness of the (relatively soft) base layer is larger than radially below (an area of) the grooves. This can help to soften the shoulder region and reduce noise. As an alternative reference to the equatorial plane of the tire or tread, one could also refer herein to the centerline of the tread.

In still another embodiment, the radial thickness of the base layer radially below the grooves is at most 20% of the radial distance between the bottom of a center groove and the radially inner side of the base layer. This is desirable for the stability of the tire in the claimed combination of hardness properties.

In yet another embodiment, in a portion of at least one shoulder region of the tread (or in other words in a cushion portion), the radial thickness of the base layer is between 110% and 40%, optionally between 90% and 50%, of the radial distance between the bottom of a center groove and the radially inner side of the base layer. This arrangement can act as a cushion in the shoulder region with lower hardness than in the radially above arranged tread cap material. A center groove may be either a groove contacting the equatorial plane of the tire or (if such a groove does not exist) the axially next groove to the equatorial plane of the tire. In case of two equally distant grooves with respect to the equatorial plane with same depth either one of them may be considered, in case of two equally distant grooves with different depths, the deeper groove may be considered, e.g. the groove with the smaller radial distance between its bottom and the radially inner side of the tread base layer.

In an embodiment, the base layer has a cushion portion between an axially outer (or in other words outermost) edge of the base layer and the groove axially nearest to that edge, wherein the cushion portion extends axially over at least 30% (preferably at least 40%) of the distance dS between said axial outer edge of the base layer and said groove. In other words, the cushion portion may be considered as a circumferential portion of the base layer which has a larger thickness than a portion of the base layer adjacent the equatorial plane or in a portion radially below the grooves, respectively. The cushion portion may in general be made of the same material/compound as the rest of the base layer. Said distance dS may also be understood as the axial distance between the axially outer edge of the base layer and the radial projection of the groove bottom onto the radially inner side of the base layer, in particular the axially outer edge of the radial projection of the groove bottom onto the radially inner side of the base layer.

In another embodiment, the cushion portion may have a tapering and/or trapezoidal shape, e.g. tapering in the radial direction, having a smaller axial width at its radially outer side and a larger axial width at its radially inner side. Such an arrangement may be advantageous for stability reasons.

In still another embodiment, the radial thickness of the base layer is one or more of: in an axially outermost region of the base layer between 50% and 120% of the radial distance between a bottom of a center groove and the radial inner side of the base layer; in a second region axially inwards of said outer region between 10% to 20% of the radial distance between a bottom of a center groove and the radial inner side of the base layer; in a third region axially inwards of said second region between 50% to 110% of the radial distance between a bottom of a center groove and the radial inner side of the base layer; and in a fourth region axially inwards of said third region between 1% to 20% of the radial distance between a bottom of a center groove and the radial inner side of the base layer.

Said axially outer portion could be absent in an alternative embodiment such that only the cushion portion axially inwards of the skirt region and said fourth portion are present.

Axially inwards or inner shall mean in general in the present application, axially closer to the equatorial plane of the tire. Axially outwards or outer is axially further from the equatorial plane of the tire. Axial direction means also a direction in parallel to the axis of rotation of the tire or tread. Similarly, radially outwards or outer means further away from the tire's axis of rotation and radially inwards or inner means closer to the tire's axis of rotation. The circumferential direction may be considered as rotation-symmetric to the tire's axis of rotation. The terms center and central may be replaceable which each other in the present application.

In another embodiment, the tread cap comprises at least two tread cap layers arranged radially on top of one another. Such tread cap layers may have different compounds with different properties. For instance, a radially lower tread cap layer could be stiffer than the radially upper cap layer. In addition, or alternatively, a radially lower tread cap layer may have a compound with lower rolling resistance than a radially outer tread cap layer, while a radially outer layer may have a compound with better wet grip than the a radially inner layer.

In another embodiment, the groove reinforcement covers the bottom of the reinforced groove and at least a bottom portion of at least one of the sidewalls of said groove.

In another embodiment the groove reinforcement extends from the radially outermost surface of the tread (the surface contacting the road when driving) in a radially inner direction below the bottom of the reinforced groove or grooves, optionally down to the radially outer side of the base layer. In general, the groove reinforcement(s) may extend in a radial direction below the bottom of the grooves. A portion of the tread cap layer could be between the reinforcement(s) and the tread base layer or one or more reinforcement extend radially inwards to contact the tread base layer or one or more reinforcements extend radially inwards through the base layer to contact a tire belt or belt overlay.

In still another embodiment, at least one of the groove reinforcements extends from the radial outer surface of the tread through the base layer, wherein the groove reinforcement rubber compound comprises at least 40 phr carbon black. This may render the groove reinforcement sufficiently electrically conductive such that an electrically conductive path is provided from the tread surface to the belt region of the tire. This may be of particular interest in case the tread cap compound and/or the base layer compound does not comprise sufficiently conductive material, e.g. high silica compounds. Thus, the degree of design freedom is increased.

In still another embodiment, the elongation at break of the groove reinforcement rubber compound is larger than 300%, optionally smaller than 700%. In particular, this improves crack resistance in the groove.

In general, the rubber compounds or compositions of the tread cap, base layer and the groove reinforcements may be different. It is also emphasized that the layers and components discussed herein are not part of the tire carcass or belt or belt overlays.

In an embodiment, one or more of the rubber compositions may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinyl-ethyl ether. Specific examples of synthetic rubbers include neoprene (polychloroprene), polybutadiene (including cis 1,4 polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized styrene-butadiene rubber (SBR), high cis-1,4-polybutadiene rubber (PBR), isoprene-butadiene rubber (IBR) and styrene-isoprene-butadiene rubber (SIBR). These rubbers can also optionally be silicon-coupled or tin-coupled star-branched polymers. The preferred rubbers or elastomers are generally natural rubber, synthetic polyisoprene rubber, polybutadiene rubber, and styrene-butadiene rubber (SBR), including SBR made by emulsion polymerization (ESBR) and SBR made by solution polymerization (SSBR). The preferred rubbers or elastomers are generally natural rubber, synthetic polyisoprene rubber, polybutadiene rubber, and styrene-butadiene rubber (SBR), including SBR made by emulsion polymerization (ESBR) and SBR made by solution polymerization (SSBR).

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In another embodiment, solution polymerization prepared SBR (S-SBR) may be used. Such an SSBR may for instance have a bound styrene content which is within the range of 5 weight percent to 50 weight percent, preferably 9 weight percent to 36 weight percent, and more typically within the range of 20 weight percent to 35 weight percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing a organo lithium compound as the initiator.

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-content may be at least 90%, optionally at least 95%. In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature (Tg) in a range of $-95°$ C. to $-105°$ C. Suitable polybutadiene rubbers which are available commercially from The Goodyear Tire & Rubber Company include Budene® 1207 high cis-1,4-polybutadiene rubber, Budene® 1208 high cis-1,4-polybutadiene rubber, and Budene® 1280 high cis-1,4-polybutadiene rubber. These high cis-1,4-polybutadiene rubbers can be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646. The teachings of U.S. Pat. Nos. 5,698,643 and 5,451,646 are incorporated herein by reference.

A reference to a glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of $10°$ C. per minute.

The term "phr" as used herein, and according to conventional practice, refers to "parts by weight of a respective material per 100 parts by weight of rubber, or elastomer." In general, a composition comprises 100 parts of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In one embodiment of this invention, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 phr and 120 phr, preferably in a range of between 20 phr to 70 phr or 80 phr to 120 phr. Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and DBP number ranging from 34 cm³/100 g to 150 cm³/100 g.

In one embodiment the rubber composition may contain a conventional sulfur containing organosilicon compounds or silanes. Examples of suitable sulfur containing organosilicon compounds are of the formula:

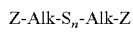

in which Z is selected from the group consisting of

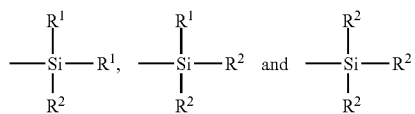

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

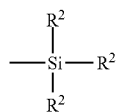

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608, 125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in U.S. Patent Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. to 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures which are typically within the range of 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In general, a tread in accordance with the present invention may be extruded by means known to the person skilled in the art, such as with a triplex extruder or a quadruplex extruder as well as with gear pump devices.

In another aspect of the invention, a tire is provided comprising a tire tread, in particular in accordance with one or more of the embodiments mentioned herein. Thus, the tire may have a tread comprising a circumferential tread cap having circumferential grooves and comprising a tread cap rubber compound for contacting the road when driving, wherein the tread cap rubber compound has a Shore A hardness from 45 to 75. Furthermore, the tread has at least one circumferential groove reinforcement reinforcing at least the bottom of at least one of the grooves and comprising a groove reinforcement rubber compound, the groove reinforcement rubber compound having a Shore A hardness which is within the range of 70 to 100. Moreover, the tire's tread has a circumferential tread base layer arranged radially inwards of the tread cap and comprising a tread base layer compound, wherein the tread base layer compound has a Shore A hardness from 15 to 60. In addition, the Shore A hardness of the tread cap compound is higher than the Shore A hardness of the tread base layer compound and the Shore A hardness of the groove reinforcement compound is higher than the Shore A hardness of the tread cap compound.

Advantages of the tire comprising a tread in accordance with an aspect of the invention or one of its embodiments or combinations thereof have already been indicated above.

It is emphasized that one or more embodiments, or features thereof, maybe be combined with each other within the scope of the present invention.

The tire could for example be a pneumatic tire, in particular a pneumatic radial and/or passenger car tire.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
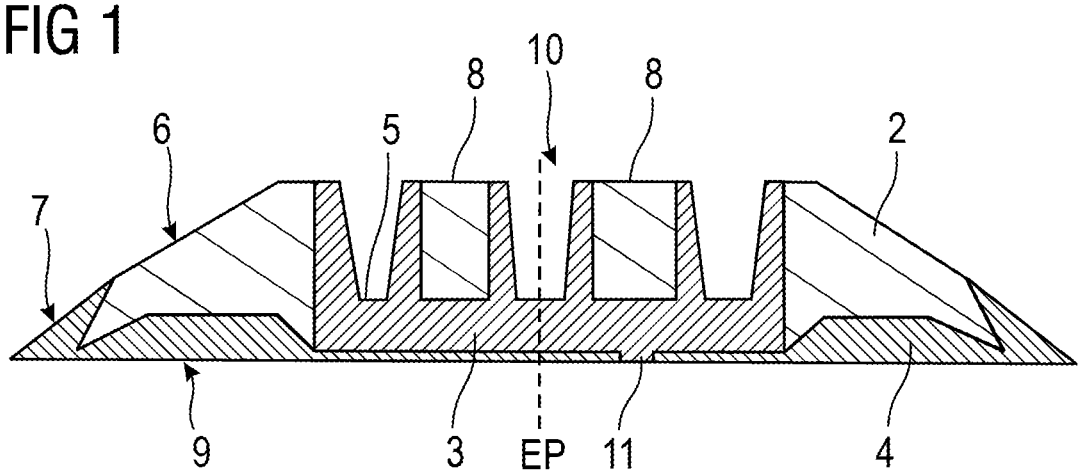
FIG. 1 represents a schematic cross section of a tire tread comprising a groove reinforcement in accordance with an embodiment of the invention.

FIG. 1 shows a schematic cross section of a tire tread 10 having a tread cap 2 with a plurality of circumferential ribs and/or tread blocks 8 between circumferential grooves 5. Moreover, said tread 10 has a base portion having a tread base 4. The tread base 4 or tread base layer 4 is made of a different compound than the cap 2 and it supports the tread cap 2 on a radially inner side of the tread 10. The tread base layer 4 has also extensions in axially outer regions 7 of the shoulder regions 6 of the tire, in other words in the skirt regions 7 of the tread 10. The grooves 5 are reinforced by a groove reinforcement 3. In other words, the groove reinforcements form the bottoms of the grooves 5 as well as their sidewalls, i.e. the sidewalls of the ribs or blocks 8. In the example shown in FIG. 1, the tread 10 has only one reinforcement covering multiple adjacent grooves 5. However, the tire could have multiple groove reinforcements which do not form an integral reinforcement as also shown in other parts of the present disclosure. In the present example, the groove reinforcement 3 reaches through a gap in the base layer 4. Such a portion 11 of the groove reinforcement 3 extending through the base layer 4 could serve as a conductive passage from the radially outermost portion of the tread 10 through the tread cap 2 and/or the base layer 4. This could be of particular interest in case the tread cap 2 and/or the tread base 4 are not electrically conductive while the groove reinforcement 3 is electrically conductive.

The three compounds in the example of FIG. 1 have different stiffness. In particular, the groove reinforcement 3 is relatively stiff, the compound of the cap 2 is softer and the compound of the tread base 4 is even softer than the compound of the tread cap 2. This arrangement can help to advantageously balance the behavior of the tread 10. For instance, the groove reinforcement's stiffness may help to improve the cornering stiffness and/or treadwear. The soft base layer material can help to improve the tire noise and comfort, especially in the shoulder regions of the tire. At the same time the tread cap compound can have desired grip properties and has a moderate stiffness between the stiffness values of the groove reinforcement 3 and the base layer 4.

In addition to the above-mentioned different stiffness values, the particular shape and or extension of the reinforcement 3, cap compound 2 and base layer 4 can further help to further improve the above-mentioned effects.

Figure 2:
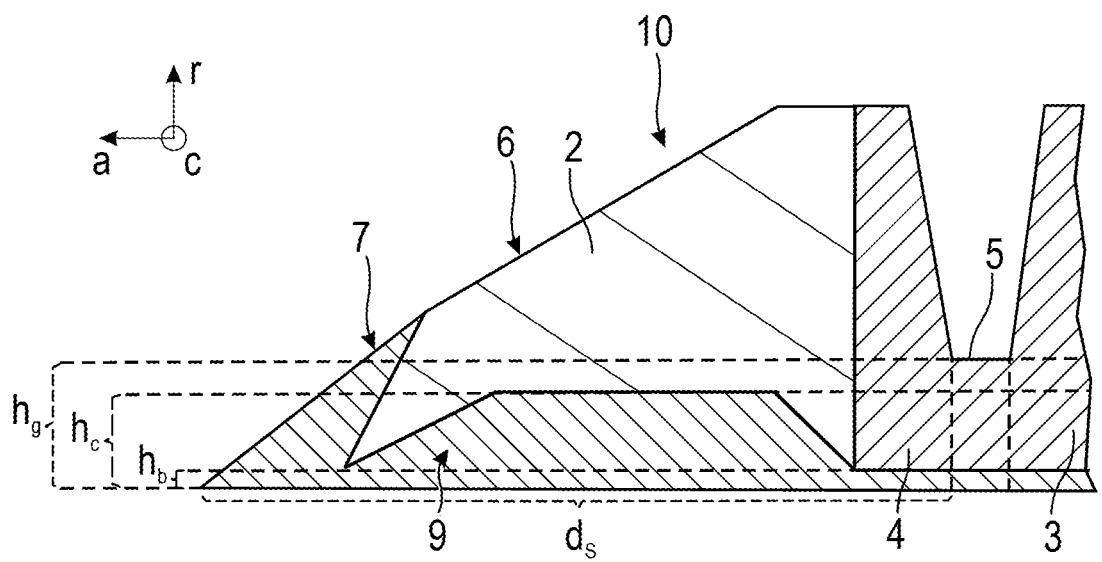
FIG. 2 shows a schematic zoom of the shoulder portion of the tread shown in FIG. 1.

In particular, the base layer 4 may have portions which extend in a radially outer direction in the skirt area 7 of the tire. In FIGS. 1 and 2, these areas have an essentially triangular cross-sectional shape and could also be described as wings. As shown in FIG. 2, the base layer 4 may have a relatively small radial thickness hb in an axial center portion of the tire, e.g. less than 15% or less than 10% of the maximum radial tread thickness of the tread base layer 4 or less than 30%, or preferably less than 20%, of the radial distance between the bottom of the axial center groove(s) 5 to the radially inner side of the base layer 4 at that position. The tread base layer 4 has also a radially thicker portion, called here a cushion or cushioning portion 9 between the central thin portion with thickness hb and the axially outermost region of the tread base 4 or tread 10. This cushion portion 9 has a (maximum) thickness hc which is about between 110% and 30%, preferably between 95% and 50%, of the radial distance hg between the groove bottom of the center groove(s) and the radially inner side of the base layer 4 at the position of the groove(s). The cushion portion 9 may extend axially over at least 30% (preferably at least 40%) of the distance dS between an axial outermost edge of the base layer 4 in the shoulder region 6 and the groove 5 closest to that shoulder. In other words, the cushion portion 9 may be considered as a circumferential portion of the base layer 4 which has a larger thickness than a portion of the base layer 4 adjacent the equatorial plane or a portion radially below the grooves 5. In particular, said distance dS (as indicated in FIG. 2) may also be understood as the axial distance between the axially outer edge of the base layer 4 and the radial projection of the groove bottom onto the radially inner side of the base layer 4. The cushion portion 9 may have essentially a trapezoidal shape having a radially inner broader base portion and a radially outer narrower portion. In other words, the cushion portion may taper in the radial outer direction. Similarly, the base layer 4 may taper in the skirt portion 7 in the radially outer direction. Moreover, the base layer 4 may extend in the skirt portion 7 beyond the maximum radial thickness of the cushion portion 9 as also shown in FIG. 2. FIG. 2 indicates schematically the radial direction r, the circumferential direction c and the axial direction a. It shall be understood that the axial direction a extends in two orientations. In general, the terms radial, axial and circumferential are used as common in the field of tires. In particular, the term circumferential shall be understood as the circumferential direction of a tire, as common in the art.

In the example of FIGS. 1 and 2, the groove reinforcement 3 extends from the radially (unworn) outermost surface of the tread 10, or in other words, the surface of the unworn tread contacting the road when driving, beyond the bottom of the grooves 5 into the direction of the base layer 4. The groove reinforcement 3 is integrally formed over the axial width of multiple grooves 5, in this example over all three grooves 5.

Figure 3:
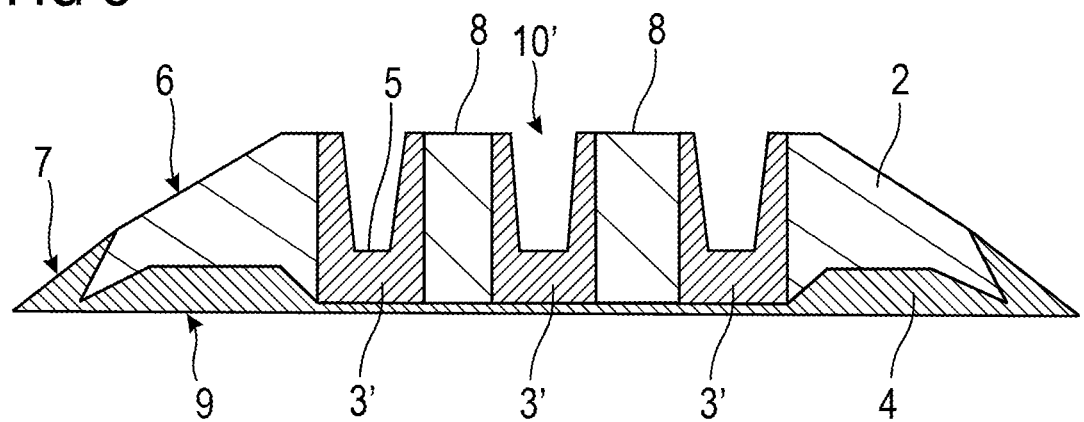
FIG. 3 is another schematic cross section of a tire tread with a groove reinforcement according to another example of the present invention.

FIG. 3 shows another embodiment of a tread 10' in accordance with the invention. In contrast to the tread 10 shown in FIG. 1, the tread 10' of FIG. 3 has three separate circumferential groove reinforcements 3', i.e. one circumferential reinforcement 3' per groove 5. Same reference numerals are used in FIGS. 3 and 4 for same or similar elements as in FIG. 1 for the sake of easier understanding. Although a conductive passage as shown with numeral 11 in FIG. 1 is not present in FIG. 3, such a passage could also be included in at least one of the reinforcements 3'. However, such a passage shall not be considered as mandatory herein. Groove reinforcements 3' have each an essentially U-shaped cross-section and extend in an inner radial direction to the radial top of the base layer 4. Moreover, the groove reinforcements 3' extend in the example each up to the outermost surface of the tread 10' and cover or encase the bottoms of the adjacent grooves 5 as well as their sidewalls. The extension of groove reinforcements 3' along the radial height of the sidewalls of the grooves 5 and covering the bottom of the grooves 5 helps to increase groove stiffness. Center portions of tread blocks or ribs 8 are essentially made of tread cap compound which is softer than the reinforcement rubber compound. Similar to the example of FIG. 1, the base layer 4 according to FIG. 3 is softer than the reinforcement rubber compound 3' and also softer than the cap 2 compound.

Figure 4:
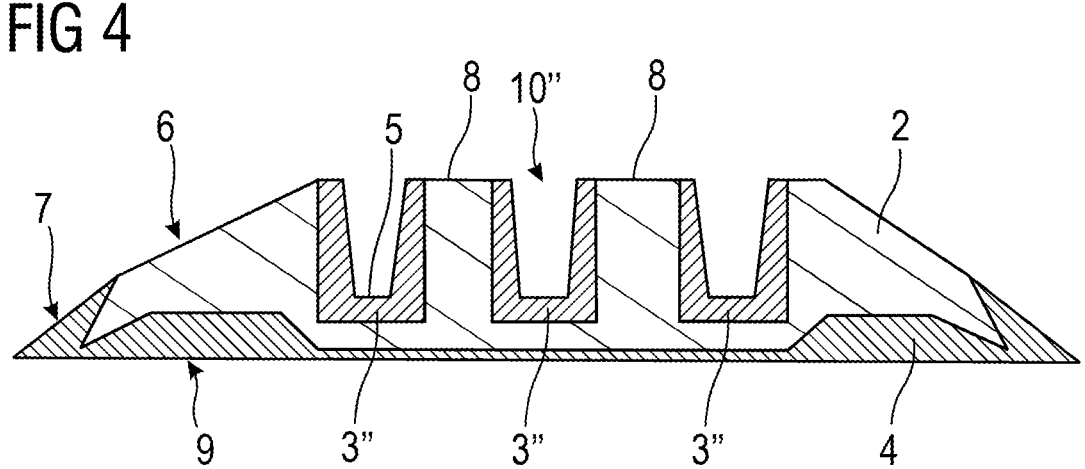
FIG. 4 is another schematic cross section of a tire tread with a groove reinforcement according to still another example of the present invention.

FIG. 4 shows yet another example tread 10'' within the scope of the present invention. This embodiment is similar to that of FIG. 3 whereas the groove reinforcements 3'' do not extend down to the base layer 4 in the radial direction. The groove reinforcements 3'' are still U-shaped but have a smaller radial thickness below the bottom of the grooves 5 than the reinforcements 3' shown in FIG. 3.

While main aspects of the present invention focus on the combination of different hardnesses of different tread components and their arrangement, for the sake of completeness, suitable example compositions are also provided hereinafter. In this context, Table 1 provides examples of suitable base layer compounds. However, it shall be re-emphasized that the main focus of the invention is not directed to the specific compounds used. Other known compounds having a Shore A hardness within the scope of the present invention could also be utilized, even if this might not result in best possible performance.

TABLE 1

| Base layer compound examples | | | | |
|---|---|---|---|---|
| Sample number | i | ii | iii | iv |
| Polybutadiene | 65 | 50 | 0 | 0 |
| Natural Rubber | 35 | 50 | 100 | 100 |
| Carbon Black | 50 | 45 | 0 | 0 |
| Pre-Silanized Silica[1] | 0 | 0 | 30 | 30 |
| Phenol Formaldehyde resins | 3 | 0 | 5 | 5 |
| TDAE Oil | 11.3 | 16 | 10 | 45 |
| Waxes | 2 | 1.5 | 3.8 | 3.8 |
| Antidegradants | 7 | 5.5 | 6.7 | 6.7 |
| Stearic Acid | 1 | 0.75 | 1 | 1 |
| Sulfenamide Accelerator | 0.6 | 1.4 | 0.9 | 0.9 |
| Zinc oxide | 3.5 | 2 | 2 | 2 |
| Sulfur | 2.8 | 1.9 | 2.5 | 2.5 |

[1]Agilon 400 ® pre-silanized silica from PPG Industries.

Table 2 shows Shore A hardness values of the samples shown above in Table 1.

TABLE 2

| Base layer compound examples | | | | |
|---|---|---|---|---|
| Sample number | i | ii | iii | iv |
| Shore A Hardness [a] | 49 | 54 | 29 | 17 |

[a] Shore A hardness was measured according to ASTM D2240.

Table 3 gives examples of suitable tread cap compounds. As mentioned already in the context of tread base layer compounds, it is emphasized again that such tread cap compounds mentioned herein are essentially considered as examples while other tread cap compounds could be used as long as they fall within the scope of the present invention.

TABLE 3

Tread cap compound examples

| Sample number | v | vi | vii |
|---|---|---|---|
| Functionalized SSBR [1] | 60 | 49 | 0 |
| Natural Rubber | 40 | 21 | 60 |
| ESBR[2] | 0 | 0 | 40 |
| Non-functionalized SSBR[3] | 0 | 30 | 0 |
| Tackifier Resin[4] | 0 | 0 | 6 |
| Carbon Black | 3 | 1 | 0 |
| Silica | 80 | 66 | 30 |
| Oils | 16 | 12 | 0 |
| Waxes | 1.5 | 2 | 1.5 |
| Fatty Acid Soap | 0 | 0 | 2 |
| Silane | 6.4 | 5.2 | 5 |
| Fatty Acid | 0 | 0 | 3 |
| Antidegradants | 3.5 | 0 | 3.5 |
| Stearic Acid | 2 | 4 | 0 |
| Sulfenamide Accelerator | 2.4 | 2.4 | 3 |
| Dithiophosphate Zinc Salt | 0.8 | 0.8 | 0 |
| Zinc oxide | 3 | 3 | 3 |
| Sulfur | 1.5 | 1.5 | 1.2 |
| Diphenylguanidine | 0 | 0 | 1.5 |

[1] Thio-functionalized, tin coupled, solution polymerized copolymer of butadiene and styrene
[2] Emulsion Styrene Butadiene Rubber, 50.8% (by weight) styrene, 8.2% vinyl 1,2; 4.2% cis 1,4; 36.8% trans 1,4; Tg (inflection) = −13° C.; 1% styrene sequences ≥5; from The Goodyear Tire & Rubber Co.
[3] non-functionalized solution polymerized copolymer of butadiene and styrene
[4] unreactive alkylphenol/formaldehyde resin, as SP 1068 from SI Group Table 4 shows Shore A hardness values of the example compositions of Table 3.

TABLE 4

Tread cap compound examples

| Sample number | v | vi | vii |
|---|---|---|---|
| Shore A Hardness [a] | 67 | 55 | 60 |

[a] Shore A hardness measured according to ASTM D2240.

Examples for suitable groove reinforcement rubber compounds may for instance be found in United States Patent Application Publication No. 2018/0134086 A1 (now issued as U.S. Pat. No. 10,427,463 B2), see in particular Examples 1, 2, 3, 4 and 5 of United States Patent Publication No. 2018/0134086 A1. Such compounds have high Shore A hardness covered by the ranges of the present disclosure. For the sake of illustration, two of the examples of that publication are listed herein below in Tables 5 to 8. Moreover, the teaching of United States Patent Application Publication No. 2018/0134086 A1 and U.S. Pat. No. 10,427,463 B2 are incorporated herein by reference for the purpose of disclosing groove reinforcement rubber formulations that can be used in the practice of this invention.

TABLE 5

Groove reinforcement compounds

| Sample number | 1 | 2 | 3 | 4 |
|---|---|---|---|---|
| polybutadiene | 10 | 10 | 10 | 10 |
| styrene-butadiene copolymer (oil extended) | 97.5 | 97.5 | 97.5 | 97.5 |

TABLE 5-continued

Groove reinforcement compounds

| Sample number | 1 | 2 | 3 | 4 |
|---|---|---|---|---|
| carbon black | 50 | 50 | 50 | 50 |
| silica | 20 | 20 | 20 | 20 |
| silane | 2 | 2 | 2 | 2 |
| phenol-formaldehyde resin[1] | 20 | 20 | 20 | 20 |
| hexamethylene tetramine | 3 | 3 | 3 | 3 |
| styrene-alpha methyl styrene resin[2] | 8 | 12 | 16 | 8 |
| carbamic resin[3] | 0 | 0 | 0 | 4 |
| wax | 1.5 | 1.5 | 1.5 | 1.5 |
| antioxidants | 3 | 3 | 3 | 3 |
| stearic acid | 3 | 3 | 3 | 3 |
| processing aid | 2 | 2 | 2 | 2 |
| zinc oxide | 2.5 | 2.5 | 2.5 | 2.5 |
| sulfur | 1.6 | 1.6 | 1.6 | 1.6 |
| N-tertbutyl-2benzothiazolesulfenamide | 1.63 | 1.63 | 1.63 | 1.63 |
| N-Cyclohexylthiophthalimide | 0.3 | 0.3 | 0.3 | 0.3 |

[1] SMD 30207 from Schenectedy Chemicals
[2] Resin 2336 from Eastman
[3] Alnovol ® UF410, from Allnex Table 6 shows high Shore A hardness values above 80 as well as considerable elongation at break values over 300% for the compounds 1 to 4 of Table 5.

TABLE 6

Groove reinforcement compounds

| Sample number | 1 | 2 | 3 | 4 |
|---|---|---|---|---|
| Shore A [a] | 83.3 | 81.8 | 83 | 85.6 |
| Elongation at break (%) [b] | 329 | 359 | 390 | 426 |

[a] Shore A hardness measured according to ASTM D2240.
[b] Ring sample test based on ASTM D412 and DIN 53504.

Table 7 lists further examples of potential compounds that could be used as groove reinforcement rubber compounds.

TABLE 7

Groove reinforcement compounds continued

| Sample number | 5 | 6 | 7 | 8 | 9 |
|---|---|---|---|---|---|
| Polybutadiene | 20 | 20 | 20 | 20 | 20 |
| Natural Rubber | 80 | 80 | 80 | 80 | 80 |
| Carbon Black | 50 | 50 | 50 | 50 | 50 |
| Waxes | 1.5 | 1.5 | 1.5 | 1.5 | 1.5 |
| Antidegradant | 2.5 | 2.5 | 2.5 | 2.5 | 2.5 |
| Ricon 184[5] | 0 | 15 | 0 | 35 | 0 |
| Ricon 100[6] | 0 | 0 | 15 | 0 | 35 |
| Oil | 15 | 0 | 0 | 0 | 0 |
| Stearic Acid | 3 | 3 | 3 | 3 | 3 |
| Silica | 20 | 20 | 20 | 20 | 20 |
| silane disulfide | 2 | 2 | 2 | 2 | 2 |
| phenol formaldehyde resin | 20 | 20 | 20 | 20 | 20 |
| fatty acid soap | 2 | 2 | 2 | 2 | 2 |
| hexamethylenetetramine | 3 | 3 | 3 | 3 | 3 |
| Antidegradant | 0.5 | 0.5 | 0.5 | 0.5 | 0.5 |
| Sulfenamide Accelerator | 2.36 | 2.36 | 2.36 | 2.36 | 2.36 |
| zinc oxide | 2.5 | 2.5 | 2.5 | 2.5 | 2.5 |
| sulfur | 1.6 | 1.6 | 1.6 | 1.6 | 1.6 |
| vulcanization inhibitor | 0.3 | 0.3 | 0.3 | 0.3 | 0.3 |

[5] liquid styrene-butadiene, Mn = 8600
[6] liquid styrene-butadiene, Mn = 4000

Table 8 shows again high Shore A hardness values as well as considerable elongation at break values for the materials 5-9 of Table 7.

TABLE 8

Groove reinforcement compounds continued

| Sample number | 5 | 6 | 7 | 8 | 9 |
|---|---|---|---|---|---|
| Shore A Hardness* | 86 | 85.4 | 86.6 | 89.3 | 90.6 |
| Elongation at Break (%)* | 508 | 518 | 508 | 481 | 502 |

*(with tests as in Table 6).

As visible in these examples for the groove reinforcement compounds, Shore A hardness values are higher than in the base layer compound or the tread cap compound. Moreover, elongation at break is higher than 300% in all samples.

In general, the tread cap layer, the groove reinforcement and tread base layer may be extruded together to form the tread as known to the person skilled in the art of extrusion and/or tire building such as with available gear pump and/or multiplex extruder technology.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case the above described embodiments and examples shall not be understood in a limiting sense. In particular, the features of the above embodiments may also be replaced or combined with one another.

The invention claimed is:

1. A tire tread comprising:
a circumferential tread cap having circumferential grooves and comprising a tread cap rubber compound, the tread cap rubber compound having a Shore A hardness which is within the range of 45 to 75,
at least one circumferential groove reinforcement reinforcing at least a bottom portion of at least one of the grooves and comprising a groove reinforcement rubber compound, the groove reinforcement rubber compound having a Shore A hardness which is within the range of 70 to 100,
a circumferential tread base layer arranged radially inwards of the tread cap and comprising a tread base layer compound, wherein the tread base layer compound has a Shore A hardness which is within the range of 15 to 50, wherein the base layer has a cushion of an essentially trapezoidal shape which extends only between an axially outer edge of the base layer and the adjacent groove, wherein the cushion extends axially over at least 30% of the distance between said axial outer edge of the base layer and the adjacent groove, wherein the cushion has a maximum thickness which is within the range of 50% to 95% of the radial distance between the groove bottom of the groove which is adjacent to the cushion and the radially inner side of the base layer at the position of the groove, and
wherein the Shore A hardness of the tread cap compound is higher than the Shore A hardness of the tread base layer compound, and wherein the Shore A hardness of the groove reinforcement compound is higher than the Shore A hardness of the tread cap compound.

2. The tire tread according to claim 1, wherein the tread cap rubber compound has a Shore A hardness which is within the range of 50 to 65 and wherein the groove reinforcement compound has a Shore A hardness which is within the range of 75 to 100.

3. The tire tread according to claim 1, wherein the tread base layer extends at least over the axial width of the radially inner bottom of the tread cap.

4. The tire tread according to claim 1, wherein the tread base layer supports the outer axial ends of the tread cap.

5. The tire tread according to claim 1, wherein a radially inner portion of the groove reinforcement extends over 30% to 60% of the axial width of the tread base layer.

6. The tire tread according to claim 1, wherein the tread has multiple circumferential groove reinforcements, each groove reinforcement reinforcing one groove and wherein each groove reinforcement has an essentially U-shaped cross section in parallel to the radial and axial directions.

7. The tire tread according to claim 1, wherein the tread has at one or more of its axial ends a skirt portion in which the base layer is radially thicker than in an area of the base layer axially closer to the equatorial plane of the tire.

8. The tire tread according to claim 1, wherein the radial thickness of the base layer radially below the grooves is at most 20% of the radial distance between the bottom of a central groove and the radially inner side of the base layer.

9. The tire tread according to claim 1, wherein in a portion of at least one shoulder region of the tread, the radial thickness of the base layer is between 110% and 40% of the radial distance between the bottom of a central groove and the radially inner side of the base layer.

10. The tire tread according to claim 1, wherein the radial thickness of the base layer is (a) in a second region axially inwards of said outer region between 10% to 20% of the radial distance between a bottom of a center groove and the radial inner side of the base layer; (b) in a third region axially inwards of said second region between 50% to 110% of the radial distance between a bottom of a center groove and the radial inner side of the base layer; and (c) in a fourth region axially inwards of said third region between 1% to 20% of the radial distance between a bottom of a center groove and the radial inner side of the base layer.

11. The tire tread according to claim 1, wherein the groove reinforcement covers the bottom of a reinforced groove and at least a bottom portion of at least one of the sidewalls of said reinforced groove.

12. The tire tread according to claim 1, wherein the groove reinforcement extends from the radially outermost surface of the tread in a radially inner direction below the bottom of the reinforced groove.

13. The tire tread according to claim 1, wherein at least one of the groove reinforcements extends from the radial outer surface of the tread through the base layer and wherein the groove reinforcement rubber compound comprises at least 40 phr carbon black.

14. The tire tread according to claim 1, wherein the elongation at break of the groove reinforcement is larger than 300%.

15. The tire tread according to claim 1, wherein the circumferential tread cap has three circumferential grooves and has a separate circumferential groove reinforcement for each groove.

16. A tire comprising a tread, the tread comprising:
- a circumferential tread cap having circumferential grooves and comprising a tread cap rubber compound, the tread cap rubber compound having a Shore A hardness from 45 to 75,
- at least one circumferential groove reinforcement reinforcing at least a bottom portion of at least one of the grooves and comprising a groove reinforcement rubber compound, the groove reinforcement rubber compound having a Shore A hardness from 70 to 100,
- a circumferential tread base layer arranged radially inwards of the tread cap and comprising a tread base layer compound, wherein the tread base layer compound has a Shore A hardness from 15 to 60, wherein the base layer has a cushion of an essentially trapezoidal shape which extends only between an axially outer edge of the base layer and the adjacent groove, wherein the cushion extends axially over at least 30% of the distance between said axial outer edge of the base layer and the adjacent groove, wherein the cushion has a maximum thickness which is within the range of 50% to 95% of the radial distance between the groove bottom of the groove which is adjacent to the cushion and the radially inner side of the base layer at the position of the groove, and
- wherein the Shore A hardness of the tread cap compound is higher than the Shore A hardness of the tread base layer compound, and wherein the Shore A hardness of the groove reinforcement compound is higher than the Shore A hardness of the tread cap compound.

* * * * *